(12) United States Patent
Dittrich et al.

(10) Patent No.: US 9,068,636 B2
(45) Date of Patent: Jun. 30, 2015

(54) MULTIGROUP TRANSMISSION OF A MOTOR VEHICLE

(75) Inventors: Alan Dittrich, Constance (DE); Rayk Gersten, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 556 days.

(21) Appl. No.: 12/991,584

(22) PCT Filed: May 5, 2009

(86) PCT No.: PCT/EP2009/055384
§ 371 (c)(1),
(2), (4) Date: Nov. 8, 2010

(87) PCT Pub. No.: WO2009/149993
PCT Pub. Date: Dec. 17, 2009

(65) Prior Publication Data
US 2011/0072923 A1    Mar. 31, 2011

(30) Foreign Application Priority Data
Jun. 9, 2008  (DE) .......................... 10 2008 002 296

(51) Int. Cl.
*F16H 3/08* (2006.01)
*F16H 37/04* (2006.01)
*F16H 61/70* (2006.01)
*F16H 61/04* (2006.01)

(52) U.S. Cl.
CPC ............ *F16H 37/042* (2013.01); *F16H 37/046* (2013.01); *F16H 61/702* (2013.01); *F16H 2061/0425* (2013.01); *Y10T 74/19242* (2015.01)

(58) Field of Classification Search
USPC ................ 74/331; 475/79, 80, 218, 207, 302; 192/3.61, 3.63, 48.4, 48.91
See application file for complete search history.

(56) References Cited

U.S. PATENT DOCUMENTS

| | | | | |
|---|---|---|---|---|
| 5,239,887 | A * | 8/1993 | Muller et al. | 74/665 GA |
| 5,823,051 | A * | 10/1998 | Hall, III | 74/325 |
| 6,440,032 | B1 * | 8/2002 | Stauber et al. | 475/207 |
| 6,460,425 | B1 * | 10/2002 | Bowen | 74/331 |

(Continued)

FOREIGN PATENT DOCUMENTS

| DE | 42 26 575 A1 | 9/1993 |
|---|---|---|
| DE | 10 2006 024 370 A1 | 12/2007 |

(Continued)

*Primary Examiner* — Troy Chambers
*Assistant Examiner* — Alexander Vu
(74) *Attorney, Agent, or Firm* — Davis & Bujold, PLLC; Michael J. Bujold

(57) ABSTRACT

A multi-group transmission of a vehicle having a motor connected to an input shaft of the transmission, via a starting element, and the transmission comprises a splitter group, a main group and a main transmission shaft, on the drive output side. A powershift unit can couple the input shaft to the main transmission shaft for engaging an intermediate gear during a gearshift. The powershift unit and a shifting device for engaging gear constants of the splitter group are an integrated unit. During operating the transmission, with the starting element at least partly engaged during intermediate gear engagement, the powershift unit operates in a slipping mode and supports torque of the motor at the main transmission shaft while rotation of the motor is synchronized with a target gear. After which, an original gear is disengaged while free from load, the target gear is engaged when synchronized, and the intermediate gear is again disengaged.

14 Claims, 2 Drawing Sheets

(56) References Cited

U.S. PATENT DOCUMENTS

| | | | |
|---|---|---|---|
| 7,070,534 B2 * | 7/2006 | Pelouch | 475/214 |
| 7,124,659 B2 * | 10/2006 | Gumpoltsberger et al. | 74/331 |
| 7,213,480 B2 * | 5/2007 | Carlsson | 74/331 |
| 8,066,606 B2 * | 11/2011 | Dittrich et al. | 475/218 |
| 8,152,691 B2 * | 4/2012 | Miller et al. | 477/124 |
| 8,161,835 B2 * | 4/2012 | Borntrager | 74/331 |
| 8,230,752 B2 * | 7/2012 | Miller et al. | 74/331 |
| 2003/0196503 A1 * | 10/2003 | Kobayashi | 74/333 |
| 2005/0284243 A1 * | 12/2005 | Carlsson | 74/331 |
| 2006/0025272 A1 * | 2/2006 | Pelouch | 475/214 |
| 2008/0047378 A1 * | 2/2008 | Borgerson et al. | 74/331 |
| 2009/0107289 A1 * | 4/2009 | Borntrager | 74/745 |
| 2009/0280956 A1 * | 11/2009 | Dittrich et al. | 477/111 |
| 2010/0105517 A1 | 4/2010 | Borntraeger | |
| 2011/0072923 A1 * | 3/2011 | Dittrich et al. | 74/333 |

FOREIGN PATENT DOCUMENTS

| | | | |
|---|---|---|---|
| DE | 10 2007 005 525 A1 | 8/2008 | |
| WO | WO 2007134943 A1 * | 11/2007 | F16H 37/04 |

* cited by examiner

MULTIGROUP TRANSMISSION OF A MOTOR VEHICLE

This application is a National Stage completion of PCT/EP2009/055384 filed May 5, 2009, which claims priority from German patent application serial no. 10 2008 002 296.9 filed Jun. 9, 2008.

FIELD OF THE INVENTION

The invention concerns a multi-group transmission of a motor vehicle and a method for operating a multi-group transmission of a motor vehicle.

BACKGROUND OF THE INVENTION

Multi-group transmissions consist of two or more transmission groups usually arranged in series, by the combination of which a large number of gears can be produced. Increasingly, they are designed as automated manual transmissions consisting, for example, of an input group, a main group and a downstream group. Such transmissions are used in particular in utility vehicles, since they provide a particularly fine gear gradation, for example with 12 or 16 gears, and their efficiency is high. For a smaller number of gears, configurations with only a main group and an input group or a main group and a downstream group are also possible. Furthermore, compared with manual-shift transmissions they are characterized by high operating comfort, and compared with automatic transmissions their production and operating costs are particularly economical.

By virtue of their structure conventional multi-group manual transmissions, in common with all manual or automated shift transmissions shifted while not under load, are characterized by an interruption of traction force during a gearshift, since the force flow from the drive motor is always interrupted by disengaging a clutch in order to disengage the currently engaged gear while free from load, synchronize the transmission and drive motor to a connection speed while in a neutral position, and then engage the target gear. Due to the coasting of the vehicle while the traction force is interrupted, undesired increases or loss of speed can occur and in addition the fuel consumption can increase. Whereas in passenger automobiles, by affecting the driving dynamics such traction force interruptions as a rule have no more than an annoying effect, for example in a sporty driving style during upshifts, in the case of heavy utility vehicles the driving speed can decrease to an extent which makes it impossible to carry out a selected gearshift and, on uphill stretches, results in undesired downshifts, crawling, or even additional starting processes.

From DE 10 2006 024 370 A1 by the present applicant an automated group-shift transmission with traction force support during gearshifts is known. The transmission comprises a splitter group as the input or upstream transmission, a main transmission as the basic transmission and a range group as the output or downstream transmission. The design of the known multi-group transmission with its input and main transmissions enables a direct gear to be engaged as an intermediate gear during a gearshift. To do this a direct connection is temporarily formed by a powershift clutch between an input shaft of the input transmission and a main shaft of the main transmission. This frees the main transmission and the splitter group from load, so that the gear engaged can be disengaged, the transmission synchronized and the target gear engaged without having to disengage the starting clutch. During this the powershift clutch transmits motor torque to the transmission output and dynamic torque that becomes free during a speed decrease between the initial and target gears is used to largely compensate for the loss of traction force. The powershift clutch, which functions as an intermediate clutch, can be positioned between the input and main transmissions or between the starting clutch provided as in a conventional transmission and the input transmission.

SUMMARY OF THE INVENTION

Against this background the purpose of the present invention is to further improve the known, traction-force-supporting multi-group transmission and a method for its operation, in particular to reduce the effort and costs for its production.

The invention is based on the recognition that in an automated multi-group shift transmission, during traction upshifts and traction downshifts an intermediate gear clutch for engaging a traction-force-supporting direct gear can be combined with a gearshift clutch for the alternate engagement of gear constants at the transmission input, in order to cut costs and reduce weight and structural space occupation.

Accordingly, the invention starts from a multi-group transmission of a motor vehicle, with an upstream group, a transmission input shaft on the drive input side which can be connected to a drive motor by a starting element, a main group, a main transmission shaft on the drive output side and with powershift means by virtue of which, to engage an intermediate gear during a gearshift, the transmission input shaft can be connected to the main transmission shaft. To achieve the stated objective the invention also provides that the powershift means and a shifting device for the engagement of gear constants in the upstream group are made as an integrated structural unit.

A gearshift is understood to be a shift process in which an original gear is disengaged and a target gear is engaged, including also the special case when the target and original gears are one and the same so that no gear ratio change takes place. An upstream group is also known as a splitter transmission or splitter group (GV), a main group also as the main transmission or basic transmission (HG) and a downstream group also as a range transmission or range group (GP). Furthermore, a frictional clutch is also known for short as a friction clutch.

In addition, the invention starts from a method for operating a multi-group transmission of a motor vehicle, having a splitter group, a transmission input shaft on the drive side which can be connected by a starting element to a drive motor, a main group, a main transmission shaft on the output side, and powershift means, in which, to provide traction force support during a gearshift, an intermediate gear is engaged with the help of the powershift means, whereby the transmission input shaft is connected to the main transmission shaft. The stated objective relating to method is achieved in that with the starting element at least partially engaged the powershift means, consisting of a friction clutch and forming an integrated structural unit with a shifting device for engaging gear constants in the splitter group, operates in slipping mode during the intermediate gear engagement to support a torque of the drive motor at the main transmission shaft while the speed of the drive motor is adapted to a synchronous speed of a target gear, an original gear is disengaged while free from load, the target gear is engaged when the synchronous speed has been reached, and to end the process the intermediate gear is then disengaged again.

Thanks to the engagement of the intermediate gear, in all traction shifts there is advantageously a significant reduction of the speed loss and thus, as a result, a drive power boost is achieved and the shifting and driving comfort are increased. Since by virtue of the intermediate gear the rotating masses to be synchronized can be braked, the transmission brake usually provided for braking those masses during upshift processes can be omitted, whereby further costs, fitting space and weight are saved or reduced. Besides, oscillations and shifting jerks are effectively reduced because during the gearshift the drivetrain remains pre-stressed by the intermediate gear at all times, whereby the shifting comfort is improved still more.

In a preferred embodiment of the invention three automated transmission groups are provided, the first being a splitter group on the transmission input side with a gear constant close to the motor and one farther away from it, the second being a central, main group with at least three gear steps, and the third being a range group on the transmission output side with two gear ranges arranged one behind the other in the force flow, such that the splitter and main groups are made as gearwheel transmissions of the countershaft design with at least one countershaft in common, while the downstream range group is made as a planetary transmission.

Preferably, such a transmission is designed with two mutually parallel, common countershafts, so that the power is correspondingly branched between the two countershafts. However, the invention can be used just as advantageously in countershaft transmissions with only one countershaft, or other group transmissions. Thanks to its fine gear gradation and its great shifting comfort, such a transmission can be used particularly advantageously in utility vehicles. For example, if the basic transmission has three gears a number of forward gears equal to $n=n_{GV} \times n_{HG} \times n_{GP} = 2 \times 3 \times 2 = 12$ is obtained since, by virtue of the gear constants of the splitter transmission the gear steps of the main group are varied, and the gears so obtained are optionally multiplied by a planetary ratio of the range group. Correspondingly, a four-gear basic transmission gives 16 possible forward gears.

The downstream range group mentioned is preferably provided so as to double the number of gears by a range shift, i.e. so as to obtain a comparatively large number of gears. For the purposes of the invention, however, it is not necessarily needed. The function of such a range group of planetary structure during traction force support by an intermediate gear designed as a direct gear can be considered as follows: in a shift position in which the planetary gears of the range group are locked with the sun gear and the ring gear, i.e. the range transmission is rotating at the same speed as the main transmission shaft, the intermediate gear is the direct gear of the transmission as a whole. This is automatically also the case when, as can be provided in another embodiment of the invention, the main transmission shaft is connected directly to a transmission output shaft at the transmission output, i.e. it passes through the range group. In such a case the main transmission can comprise an additional output shaft, for example a hollow shaft surrounding the main transmission shaft coaxially, which carries the shifting devices of the main transmission and, at its output-side end, instead of the main transmission shaft, is connected to the sun gear of the range transmission.

Otherwise, however, the intermediate gear is a direct gear of the gearwheel transmission groups, with the planetary transmission ratio superposed on it. In this case it must also be noted that a shift of the range group during a gearshift is not traction-force-supported per se. However, the traction force support can be advantageously extended to the range shift by arranging powershift means in the range transmission beforehand, so that a range shift under load is possible. If no downstream group is provided, the main transmission shaft at the same time acts as the transmission output shaft of the transmission as a whole, or it can be connected integrally to a transmission output shaft.

The arrangement according to the invention with powershift means for engaging an intermediate gear and a shifting device for shifting gear constants in the splitter group, made as an integrated structural unit, can be implemented with comparatively little cost and effort in a conventional multi-group transmission. The gear-constant shifting device can be formed as a synchronous clutch and the intermediate-gear clutch as a simple friction clutch. A synchronous clutch for shifting the gear constants is usually arranged axially between the gearsets of the gear constants. According to the invention, the friction clutch can be fitted between the synchronizers of the gear constants. Thus, only the shifting device of the splitter group has to be changed and if necessary adapted to the axial separation of the gear constants, while no other structural measures are needed, which works out to be particularly inexpensive.

A particularly compactly built and weight-saving structural unit comprising the intermediate-gear clutch and the synchronous clutch can be produced, in which an input portion connected to the transmission input shaft, which carries on the motor side a first shift element for forming a rotationally fixed connection between a loose wheel of a first gear constant close to the motor and the transmission input shaft, and on the transmission side a second shift element for forming a rotationally fixed connection between a loose wheel of a second gear constant farther away from the motor and the transmission input shaft, acts as the shifting device for engaging the gear constants, while an output portion connected to the main transmission shaft, together with the input portion connected to the transmission input shaft, acts as the powershift means for engaging a direct connection of the transmission input shaft to the main transmission shaft as the intermediate gear.

Accordingly, to engage the gear constants the respective shift element seated on the input portion is advantageously connected with interlock to a counter-element seated on the loose wheel, by synchronizing means known per se comprising a clutch body, synchronizer ring/synchronizer cone and a shift sleeve for synchronizing the speed between the loose wheel and the input portion, so that the loose wheel of the gear constant concerned is rotationally fixed to the transmission input shaft in the power flow.

To engage the intermediate gear the friction clutch integrated in the shifting device of the splitter group is engaged, i.e. friction surfaces on the input portion and on the output portion of the friction clutch that co-operate with one another are brought into contact, whereby the main transmission shaft is connected to the transmission input shaft by friction or, if controlled so as to slip, in a slipping mode. By engaging this direct connection as an intermediate gear during a gearshift the main transmission is relieved from load and can therefore be shifted so that, if appropriate for the gearshift, the gear engaged in the main transmission is disengaged and the main transmission can go into neutral without interruption of the power flow between the drive motor and the driven wheels. During this the integrated intermediate-gear clutch supports the motor torque in slipping mode at the drive output during the traction upshift or traction downshift, while the motor speed is adapted to the target gear. The torque that becomes free during this speed adaptation of the drive motor, i.e. due to a speed reduction in the case of an upshift, is thus used for maintaining the traction force.

During the shift process the starting element preferably remains fully engaged throughout in order to maintain the traction force as completely as possible. When the synchronous speed has been reached, i.e. when the speeds of the main transmission shaft and the loose wheel to be connected with it are equal, the target gear can be engaged and the intermediate gear can be disengaged again. In an analogous manner, if appropriate for the gearshift concerned, the gear constants of the splitter group can also be changed while the traction force is being supported by the intermediate gear.

Basically—provided this is permitted by the shifting scheme applicable in each case—any shift combinations with a gearshift in the main transmission and/or a shift between the gear constants in the splitter group can take place with traction force support by engaging the intermediate gear. In addition, a gear-range shift in the downstream range group can be traction-force-supported as described earlier. Thus, in a gearshift, besides the usual sequential shift sequences, traction-force-supported gear jumps over two or more gear steps starting from any desired original gear are possible, which can be advantageous for a high level of shifting and driving comfort particularly in the case of finely gradated utility vehicle transmissions during driving and maneuvering operation.

BRIEF DESCRIPTION OF THE DRAWINGS

To clarify the invention the description of a drawing representing an example embodiment is attached. The drawing shows.

DETAILED DESCRIPTION OF THE PREFERRED EMBODIMENTS

Figure 1:
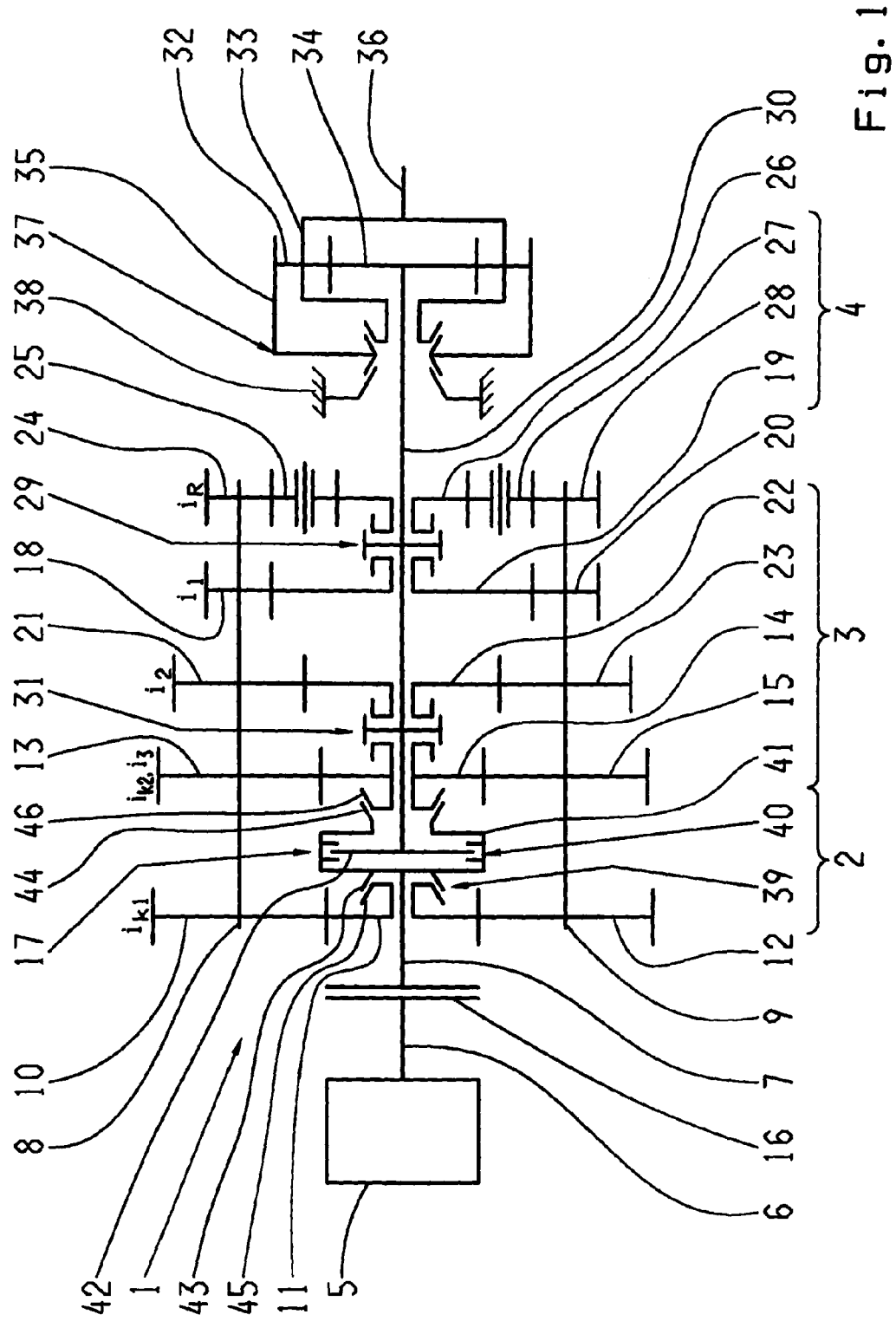
FIG. 1: Transmission layout of an automated multi-group transmission of a motor vehicle with an integrated intermediate-gear/gear constant structural unit.

FIG. 1 shows an automated multi-group transmission designed as a dual-countershaft transmission 1 with two mutually parallel countershafts 8, 9 mounted to rotate and with three transmission groups 2, 3 and 4 arranged one after another, as can be provided for example in the drivetrain of a utility vehicle. Such a transmission is known per se from DE 10 2006 024 370 A1 by the present applicant, mentioned at the start.

A driveshaft 6 of a drive motor 5 can be frictionally connected by a conventional starting element 16 to a transmission input shaft 7. The first transmission group 2, arranged on the transmission input shaft 7, is designed as a two-gear splitter transmission. The second, central transmission group 3 is formed by a three-gear main or basic transmission. Arranged as the third transmission group 4 on the drive output side is a downstream, two-gear range transmission.

The splitter transmission 2 has two gear constants ik1, ik2, each of which comprises fixed wheels 10, 12 and 13, 15, respectively arranged rotationally fixed on the first countershaft 8 and on the second countershaft 9, which mesh with respective loose wheels 11 and 14. The first gear constant ik1 faces toward the starting element 16 and the second gear constant ik2 toward the main transmission 3. According to the invention, between the gear constants ik1, ik2 is arranged an integrated structural unit 17 which comprises on the one hand a shifting device 39 designed as a synchronous clutch for the alternate engagement of the gear constants ik1, ik2 and on the other hand powershift means (e.g., a powershifter) 40 in the form of a friction clutch for engaging an intermediate gear designed as a direct gear.

The structural unit 17 has an outer, pot-like input portion 41 connected on the motor side to the transmission input shaft 7. On the two ends of the input portion 41 are arranged shift elements 43 and 44 which, together with corresponding adjacent shift elements 45 and 46 on the loose wheels 11 and 14, and the usual synchronizing elements (not shown) positioned between them, form the synchronous clutch 39.

By engaging the synchronous shift elements 43, 45 close to the motor or the synchronous shift elements 44, 46 farther away from the motor, having previously synchronized speeds by means of the synchronizing elements, either the loose wheel 11 of the first gear constant $i_{k1}$ or the loose wheel 14 of the second gear constant $i_{k2}$, respectively, can be connected in a rotationally fixed manner to the transmission input shaft 7, whereby the associated fixed wheels 10, 12 or 13, 15 seated on the respective countershafts 8, 9, and by virtue of these the countershafts 8, 9 themselves, can be driven.

The structural unit 17 also has an inner, output portion 42 which is connected in a rotationally fixed manner to one end, on the transmission input side, of a main transmission shaft 30. The main transmission shaft 30 passes through the main transmission 3 as a central drive output shaft. It carries the claw-type shifting devices 29 and 31 described below for the gears $i_1/i_R$, $i_2/i_3$ of the main transmission 3 and its other end, on the transmission output side, is actively connected, via the range transmission 4, to a transmission output shaft 36. The input portion 41 and the output portion 42 form the intermediate-gear clutch 40 by virtue of ordinary, co-operating friction partners for forming a frictional direct connection between the transmission input shaft 7 and the main transmission shaft 30.

The main transmission 3 has three forward-gear gearsets $i_1$, $i_2$ and $i_3$ and a reverse-gear gearset $i_R$. The first main transmission gear $i_1$ and the second main transmission gear $i_2$ each comprise two fixed wheels 18, 20 or 21, 23 and a loose wheel 19 or 22, respectively. The third main transmission gear $i_3$ is produced together with the second gear constant $i_{k2}$ of the splitter transmission 2. The reverse-gear gearset $i_R$ comprises two fixed wheels 24, 28, a loose wheel 26 and two intermediate wheels 25, 27 mounted to rotate for rotation direction reversal, which mesh on the one hand with the respectively associated fixed wheel 24 or 28 and on the other hand with the loose wheel 26.

To engage the first main transmission gear $i_1$ and the reverse-gear gearset $i_R$ the unsynchronized claw shifting device 29 is provided, by means of which the associated loose wheels 19 or 26 can selectively be connected in a rotationally fixed manner to the main transmission shaft 30. To engage the second main transmission gear $i_2$ and the third main transmission gear $i_3$, the unsynchronized claw shifting device 31 is also provided, by means of which the associated loose wheels 22 or 14 can selectively be connected in a rotationally fixed manner to the main transmission shaft 30. The gears $i_1$, $i_2$, $i_3$, $i_R$ of the main transmission 3 transmit the power flow from the countershafts 8, 9 to the main transmission shaft 30, and from it farther in the direction of the transmission output 36.

Since the third main transmission gear $i_3$ and the second gear constant $i_{k2}$ use the same gearset $i_{k2}/i_3$, the loose wheel 14 of this gearset $i_{k2}/i_3$ can be connected by the shifting device 39 of the splitter group 2 on the drive input side to the transmission input shaft 7, and by the shifting device 31 for the second main transmission gear $i_2$ and the third main transmission gear $i_3$, on the output side, to the main transmission shaft 30.

The downstream range transmission 4 is made as a planetary transmission. In it, a planetary gearset 32 is guided by a planetary gear carrier 33. The planetary gearwheels (not shown explicitly) mesh on the one hand with a central sun gear 34 and on the other hand with an outer ring gear 35. The sun gear 34 is connected to the main transmission shaft 30. In turn, the planetary gear carrier 33 is connected to the transmission output shaft 36. To shift the range transmission 4 a shifting device 37, advantageously with synchronization, is provided. In a first shift position this shifting device 37 connects the ring gear 35 to a housing 38, so that the planetary gears rotate between the ring gear 35 and the sun gear 34, and the transmission output shaft 36 is driven by the planetary carrier 33 in the same direction as the main transmission shaft 30 in accordance with a gear ratio of the planetary transmission. In a second shift position the ring gear 35 is locked onto the planetary gear carrier 33, so that the planetary transmission 4 and thus also the transmission output shaft 36 rotate directly at the speed of the main transmission shaft 30.

The combination of the three transmission groups 2, 3, 4 of the transmission layout 1 shown gives a total of 2×3×2=12 gears. The force flow of the transmission 1 branches in accordance with a shift sequence in which, beginning with the first gear in the main transmission 3, first the splitter transmission 2 and the main transmission 3 are shifted through in alternation so that, in succession, 2×3=6 gears of a lower gear range "Gear 1 to Gear 6" are engaged. When the sixth gear is reached, the range transmission 4 shifts and the main transmission 3 and the splitter group 2 are again shifted through in alternation so that again 2×3=6 gears, but this time in an upper gear range "Gear 7 to Gear 12" are engaged. Furthermore, by shifting between the gear constants $i_{k1}$, $i_{k2}$ of the splitter transmission 2, two reverse gear ratios are available.

In the shift sequence described, in Gear 6 and in Gear 12 the transmission input shaft 7 is connected to the main transmission shaft 30 by means of the engaged second gear constant $i_{k2}$ and the engaged third main transmission gear $i_3$, so in Gear 6 i=1 plus the range group gear ratio and in Gear 12 i=1 including the range group gear ratio. However, if Gear 11 and Gear 12 are designed as fast gears with a ratio i<1, the shift sequence could also be changed so that Gear 10 already adopts this shift position and is therefore the direct gear.

Figure 2:
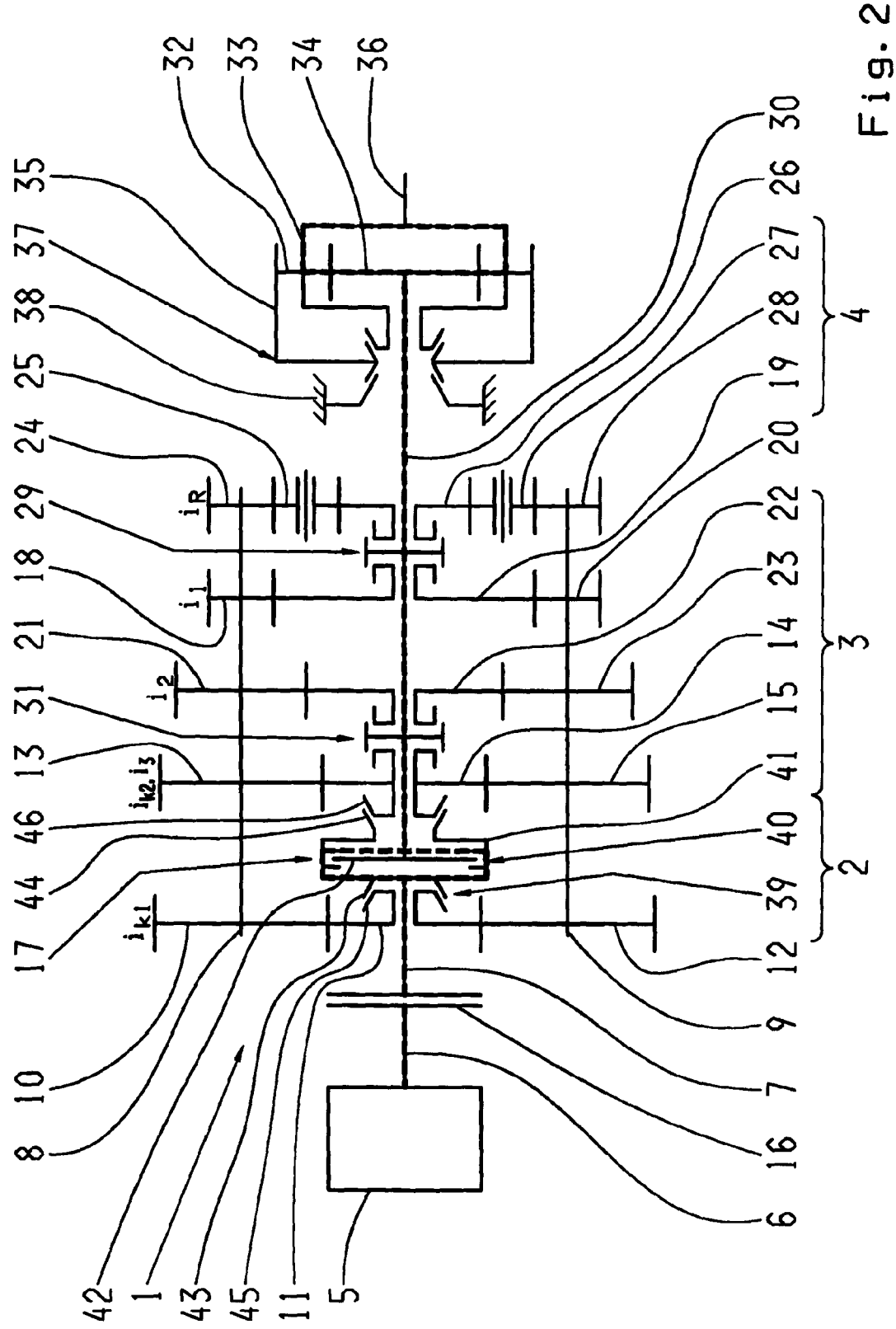
FIG. 2: Torque flow of an intermediate gear of the transmission layout

The direct ratio i=1 also corresponds to the intermediate gear. To engage the intermediate gear designed as a direct gear or a direct gear plus the range group gear ratio, as already explained the main transmission shaft 30 can be directly connected to the transmission input shaft 7 by means of the intermediate-gear clutch 40, and in contrast to the above interlocked direct gear, the frictional direct gear can be controlled in slipping mode by the intermediate-gear clutch 40. To make this clear the torque flow in the intermediate gear is emphasized by broken lines in FIG. 2.

A method according to the invention for operating a multi-group transmission can be implemented with the above-described transmission layout 1. The basis of the method is essentially that to maintain the traction force during a gearshift, the starting element 16 remains engaged and an intermediate gear is engaged by means of the intermediate-gear clutch 40.

When a shift command for a traction upshift or downshift is initiated by the driver or a transmission control unit, by means of the intermediate-gear clutch 40 in slipping operation, a direct connection is formed between the transmission input shaft 7 and the main transmission shaft 30 or the transmission output shaft 36. Thereby, with the starting element 16 still engaged the main transmission 3 is relieved from load and can be shifted. Provided this is appropriate for the gearshift concerned, the gear engaged in the main transmission 3 is disengaged and the main transmission 3 is brought to neutral. By means of a clutch control system (not shown) the intermediate-gear clutch 40 is operated in a controlled slipping mode to support the torque of the drive motor at the drive output during the shifting process, while the motor speed is adapted to the target gear called for. When the synchronous speed is reached, i.e. when the rotation speeds of the main transmission shaft 30 and the loose wheel 14, 19, 22 to be engaged are equal, i.e. the corresponding shift device 29, 31 is actuated. If the gearshift involves a switch between the two gear constants $i_{k1}$, $i_{k2}$, then instead of a shift process in the main transmission 3 or in addition to a shift process in the main transmission 3, the synchronous clutch 39 is shifted.

All traction shifts with shift processes in the splitter transmission 2 and/or in the main transmission 3 can take place with traction force support by virtue of the intermediate gear. When shifting from Gear 6 to Gear 7, in addition to the shift processes described in the splitter transmission 2 and in the main transmission 3, a gear range shift takes place in the range transmission 4 by means of the synchronous shifting device 37, which is traction-force-supported by virtue of additional measures or, if appropriate, not traction-force-supported. To complete the gearshift, the intermediate gear is disengaged again by disengaging the intermediate gear clutch 40.

LIST OF INDEXES

1 Dual-countershaft transmission
2 Upstream splitter group
3 Main group
4 Downstream range group
5 Drive motor
6 Driveshaft
7 Transmission input shaft
8 Countershaft
9 Countershaft
10 Fixed wheel
11 Loose wheel
12 Fixed wheel
13 Fixed wheel
14 Loose wheel
15 Fixed wheel
16 Starting element
17 Structural unit
18 Fixed wheel
19 Loose wheel
20 Fixed wheel
21 Fixed wheel
22 Loose wheel
23 Fixed wheel
24 Fixed wheel
25 Intermediate wheel
26 Loose wheel
27 Intermediate wheel
28 Fixed wheel
29 Shifting device
30 Main transmission shaft
31 Shifting device
32 Planetary gearset
33 Planetary gear carrier
34 Sun gear
35 Ring gear
36 Transmission output shaft
37 Shifting device
38 Housing
39 Shifting device
40 Powershift means
41 Input portion
42 Output portion 43 Shift element
44 Shift element
45 Shift element
46 Shift element
$i_{k1}$ Splitter transmission gear constant
$i_{k2}$ Splitter transmission gear constant
$i_1$ Main transmission gear
$i_2$ Main transmission gear
$i_3$ Main transmission gear
$i_R$ Main transmission reversing gear

The invention claimed is:

1. A multi-group transmission of a motor vehicle comprising:
   an upstream splitter group (2),
   a transmission input shaft (7) for the transmission being connectable, via a starting element (16), with a drive motor (5),
   a main transmission shaft (30) providing an output of the transmission, and
   an integrated structural unit (17) comprising both a powershifter (40) and a shifting device (39), and at least a portion of each of the powershifter (40) and the shifting device (39) are fixedly connected with one another and with the transmission input shaft (7); the powershifter (40), when engaged, directly engaging the transmission input shaft (7) with the main transmission shaft (30) to form an intermediate gear during a gearshift and the powershifter (40), when disengaged, permitting relative rotation between the transmission input shaft (7) and the main transmission shaft (30), and the shifting device (39) selectively shifting a desired one of first and second gear constants ($i_{k1}$, $i_{k2}$) of the splitter group (2); and
   the powershifter (40) is a friction clutch which is axially located between the first and the second gear constants of the splitter group.

2. The multigroup transmission according to claim 1, wherein the shifting device (39) is a synchronous clutch which is axially located between the first and the second gear constants of the splitter group.

3. The multigroup transmission according to claim 1, wherein
   an input portion (41) of the integrated structural unit is permanently connected to the transmission input shaft (7), and carries a first shift element (43) and a second shift element (44);
   the first shift element (43), carried on a motor side of the input portion, facilitates a rotationally fixed connection between a loose wheel (11) of the first gear constant ($i_{k1}$), adjacent the motor, and the transmission input shaft (7),
   the second shift element (44), carried on a transmission side of the input portion, facilitates a rotationally fixed connection between a loose wheel (14) of the second gear constant ($i_{k2}$), further away from the motor, and the transmission input shaft (7);
   the transmission input shaft (7) acts as the shifting device (39) for engaging the first and the second gear constants ($i_{k1}$, $i_{k2}$); and
   an output portion (42) of the integrated structural unit, connected with the main transmission shaft (30), together with the input portion (41), connected with the transmission input shaft (7), act as the powershifter (40) for engaging a direct drive between the transmission input shaft (7) and the main transmission shaft (30) as the intermediate gear, the output portion of the integrated structural unit is axially located between the first and the second gear constants.

4. The multigroup transmission according to claim 1, wherein
   the multi-group transmission comprises the splitter group, a main group and a downstream range group (2, 3, 4),
   the upstream splitter group (2), on the transmission input side, has the first gear constant ($i_{k1}$) adjacent the motor and the second gear constant ($i_{k2}$) further away from the motor, the powershifter and the shifting device being axially located between the first and the second gear constants,
   the main group (3) has at least three gear steps ($i_1$, $i_2$, $i_3$) and the downstream range group (4), on the transmission output side, has two gear ranges,
   the splitter group (2), the main group (3) and the range group (4) are arranged sequentially along a power flow one after another,
   the splitter group (2) and the main group (3) are formed as gearwheel transmissions of a countershaft design with at least one countershaft (8, 9) in common,
   the range group (4) is a planetary transmission.

5. The multigroup transmission according to claim 4, wherein the range group (4) comprises the powershifter for gear range shifting free from a traction force interruption.

6. The multigroup transmission according to claim 1, wherein the main transmission shaft (30) is actively connected, via a range group (4), to a transmission output shaft (36), an input end of the main transmission shaft that directly engages the input shaft via the powershifter is axially located between the first and the second gear constants of the splitter group.

7. The multigroup transmission according to claim 1, wherein the main transmission shaft (30) passes through a range group (4) and is directly connected with a transmission output shaft (36), the powershifter and the shifting device are axially located between the first and the second gear constants of the splitter group.

8. The multigroup transmission according to claim 1, wherein an output portion (42) of the powershifter (40) is continuously fixed to an axial input end of the main transmission shaft and axially separates a shift element (45) of a loose wheel (11) of the first gear constant ($i_{k1}$), adjacent to the motor, from a shift element (46) of a loose wheel (14) of the second gear constant ($i_{k2}$) further away from the motor.

9. The multigroup transmission according to claim 1, wherein a first portion of the powershifter (40) is fixedly connected with the transmission input shaft (7) so as to rotate therewith while a second portion of the powershifter (40) is fixedly connected with the main transmission shaft (30) so as to rotate therewith and the first and the second portions of the powershifter are axially located between the first and the second gear constants of the splitter group.

10. The multigroup transmission according to claim 1, wherein a first end of the main transmission shaft (30) is received and housed within the integrated structural unit (17), the first end of the main transmission shaft (30) is axially located between the first and the second gear constants of the splitter group.

11. The multigroup transmission according to claim 1, wherein the shifting device (39), when engaged in a first position, selectively shifting a first one of first and second gear constants ($i_{k1}$, $i_{k2}$) of the splitter group (2) and, when engaged in a second position, selectively shifting a second one of first and second gear constants ($i_{k1}$, $i_{k2}$) of the splitter group (2).

12. A multi-group transmission of a motor vehicle comprising:
    an upstream splitter group (2);

a transmission input shaft (7) being connectable, via a starting element (16), with a drive motor (5);

a main transmission shaft (30) for providing an output from the transmission; and an integrated structural unit (17) supporting a first element of a powershifter (40) and a pair of first elements of a shifting device (39), and the first element of the powershifter (40) and the pair of first elements of the shifting device (39) being integral with one another and the transmission input shaft (7);

a second element of the powershifter (40) being supported by the main transmission shaft (30);

the powershifter (40), when engaged, directly engaging the transmission input shaft (7) with the main transmission shaft (30) to form an intermediate gear during a gearshift and the powershifter (40), when disengaged, permitting relative rotation between the transmission input shaft (7) and the main transmission shaft (30);

a first mating element, for engaging with a first one of the pair of first elements of the shifting device (39), being supported by a first loose gear for achieving a first gear constant ($i_{k1}$) of the splitter group (2);

a second mating element, for engaging with a second one of the pair of first elements of the shifting device (39), being supported by a second loose gear for achieving a second gear constant ($i_{k2}$) of the splitter group (2); and the shifting device (39) being selectively shiftable into first and second positions for shifting a desired one of the first and the second gear constants ($i_{k1}$, $i_{k2}$) of the splitter group (2), the powershifter being axially located between the first and second gear constants.

13. A method of operating a multi-group transmission of a motor vehicle, comprising a drive motor (5) which is connectable, via a starting element (16), with an input side of a transmission input shaft (7), an upstream splitter group (2), a main transmission shaft (30) on an output side of the transmission, and a powershifter (40) for supporting a traction force during a gearshift, and an intermediate gear is engaged, with assistance of the powershifter (40), such that the transmission input shaft (7) is connected with the main transmission shaft (30), the method comprising the steps of:

at least partly engaging the starting element (16), forming the powershifter (40) as a friction clutch which, together with a shifting device (39) for engaging first and second gear constants ($i_{k1}$, $i_{k2}$) in the splitter group (2), form an integrated structural unit (17), the powershifter and the shifting device being axially located between the first and the second gear constants and at least a portion of the powershifter (40) and the shifting device (39) being rotationally fixedly connected so as to rotate with one another and the transmission input shaft (7), and the powershifter (40) operating in a slipping mode to support a motor torque of the drive motor (5) at the main transmission shaft (30) during engagement of the intermediate gear while adapting a rotational speed of the drive motor (5) to a synchronous speed of a target gear;

disengaging an original gear while free from load;

engaging the target gear upon reaching the synchronous speed; and again disengaging the intermediate gear.

14. The method according to claim 13, further comprising the step of fully engaging the starting element (16) during a gearshift with the intermediate gear engaged.

* * * * *